United States Patent
Schaffer et al.

(10) Patent No.: US 9,553,507 B1
(45) Date of Patent: Jan. 24, 2017

(54) SELF REGULATING CURRENT TO CURRENT CHARGE PUMP

(71) Applicant: XCELSEM, LLC, Santa Clara, CA (US)

(72) Inventors: Gregory L. Schaffer, Cupertino, CA (US); Maarten Jeroen Fonderie, Santa Clara, CA (US)

(73) Assignee: XCELSEM, LLC, Santa Clara, CA (US)

( * ) Notice: Subject to any disclaimer, the term of this patent is extended or adjusted under 35 U.S.C. 154(b) by 0 days.

(21) Appl. No.: 15/174,503

(22) Filed: Jun. 6, 2016

(51) Int. Cl.
  *G05F 1/10* (2006.01)
  *G05F 3/02* (2006.01)
  *H02M 3/07* (2006.01)
  *H03K 3/03* (2006.01)

(52) U.S. Cl.
  CPC ............. *H02M 3/07* (2013.01); *H03K 3/0315* (2013.01)

(58) Field of Classification Search
  USPC .................................................. 327/535, 536
  See application file for complete search history.

(56) References Cited

U.S. PATENT DOCUMENTS

| 2014/0347022 A1* | 11/2014 | Yahagi | G05F 1/56 323/273 |
| 2016/0118991 A1* | 4/2016 | Huang | H03B 5/1271 331/18 |
| 2016/0173045 A1* | 6/2016 | Creosteanu | H03F 1/523 330/258 |
| 2016/0182038 A1* | 6/2016 | Pandita | H03K 17/687 327/108 |

\* cited by examiner

*Primary Examiner* — Adam Houston
(74) *Attorney, Agent, or Firm* — Gary Stanford (57) ABSTRACT

A current to current charge pump including two flying capacitors, a capacitor driver, two rectifying inverters, a bypass capacitor coupled between an input node and a control node, a current control transistor circuit coupled between the control node and a reference node, and an output circuit coupled between upper and lower nodes. One of the upper and lower nodes is held at a constant voltage level. A storage capacitor is coupled between the upper and lower nodes. The capacitor driver drives each of the flying capacitors to opposite states between the control and input nodes using a clock signal. The rectifying inverters are cross-coupled between the flying capacitors, and have supply terminals coupled between the upper and lower nodes. The current control transistor circuit develops an input current at the control node based on a reference current. The output transistor circuit develops an output current that follows the input current.

23 Claims, 6 Drawing Sheets

SELF REGULATING CURRENT TO CURRENT CHARGE PUMP

BACKGROUND OF THE INVENTION

Field of the Invention

The present invention relates in general to charge pumps, and more particularly to a self-regulating, current in, current out (current to current) charge pump.

Description of the Related Art

Conventional charge pumps typically convert one voltage to another voltage. Many configurations operate as doublers or triplers or the like in which the output voltage is a selected multiple of the input voltage. In many applications it is desired to provide a current in, current out (or current to current) charge pump, that is, a charge pump that converts an input current to an output current. One such application is an analog comparator, in which it is desired to provide the tail current (or common source current) for PMOS transistors connected as a differential pair at the input of the analog comparator. It is beneficial to have the output current track the input current over process and temperature variations so that the ratio of the output current to the input current remains approximately constant. A conventional approach is to provide regulation circuitry with feedback to maintain the desired current conversion ratio between the input and output of the charge pump. It has been determined, however, that such regulation circuitry can lead to instabilities caused by the feedback regulation circuitry.

SUMMARY OF THE INVENTION

A current to current charge pump according to one embodiment includes two flying capacitors, a capacitor driver, two rectifying inverters, a bypass capacitor coupled between an input node and a control node, a current control transistor circuit coupled between the control node and a reference node, and an output circuit coupled between upper and lower voltage nodes. A storage capacitor may be coupled between the upper and lower voltage nodes. The capacitor driver drives a first terminal of each of the flying capacitors to opposite states between the control node and the input node using a clock signal. The rectifying inverters have inputs and outputs cross-coupled between the second terminals of the flying capacitors, and have supply terminals coupled between the upper and lower voltage nodes. The current control transistor circuit develops an input current at the control node based on a reference current. The output transistor circuit develops an output current that follows the input current. One of the upper and lower voltage nodes is coupled to a constant voltage source, such as the input voltage node or the reference voltage node.

A bias circuit may provide the reference current. In one embodiment, the bias circuit provides the reference current to a diode-coupled reference transistor coupled between a bias node and the reference node so that the bias node develops a bias voltage. The current control transistor circuit includes a gate terminal coupled to the bias node in a current mirror configuration. The size and/or number of current control transistors in the current control transistor circuit is selected to drive the input current at a multiple of the reference current. An additional transistor may be provided having current terminals between the oscillator and the reference node and having a control terminal coupled to the bias node. The additional transistor is thus in a current mirror configuration with the reference transistor to provide current to activate the oscillator. The current control transistor circuit may be implemented in a cascode configuration including a higher voltage cascode transistor. The additional transistor may also be implemented in a cascode configuration.

The output circuit may include multiple output transistors to provide multiple output currents, each following the input current. A filter resistor may be provided and coupled either to the upper voltage node (forming a filtered upper voltage node) or to the lower voltage node (forming a filtered lower voltage node), in which the output circuit is coupled instead to the filtered voltage node. If additional capacitance is desired, a filter capacitor may be included and coupled in parallel with the output circuit. The output circuit may also be implemented in a cascode configuration.

A self regulating current to current charge pump according to one embodiment includes a capacitor driver, an input transistor, first and second flying capacitors, first and second inverters, a bypass capacitor coupled between an input node and a control node, and an output transistor coupled between upper and lower nodes. A storage capacitor may be coupled between the upper and lower nodes. One of the upper and lower nodes is coupled to a constant voltage source, such as the input node or a reference node. The capacitor driver has first and second drive outputs that are toggled to opposite states between the input node and the control node based on a clock signal. The input transistor has current terminals coupled between the control node and the reference node, has a control terminal coupled to a bias node, and develops an input current. One end of each of the flying capacitors is coupled to one of the drive outputs of the capacitor driver. The inverters are cross-coupled between the second ends of the flying capacitors and have supply voltage terminals coupled between the upper and lower nodes. The output transistor is coupled to the upper and lower nodes and provides an output current that follows the input current.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

A current to current charge pump according to embodiments of the present invention automatically self-regulates thereby eliminating the need for active feedback circuitry. The current to current charge pump automatically adjusts itself so that the ratio of the output current remains substantially constant over process and temperature variations without the use of active feedback circuitry. The current to current charge pump may be used in many different applications, including providing a predictable tail current for a pair of PMOS transistors at the input of an analog comparator. The current to current charge pump simplifies the current sources powered by charge pumps. The current to current charge pump is self-regulating and responds quickly to changes such as overdrive of input stage common mode voltage.

Figure 1:
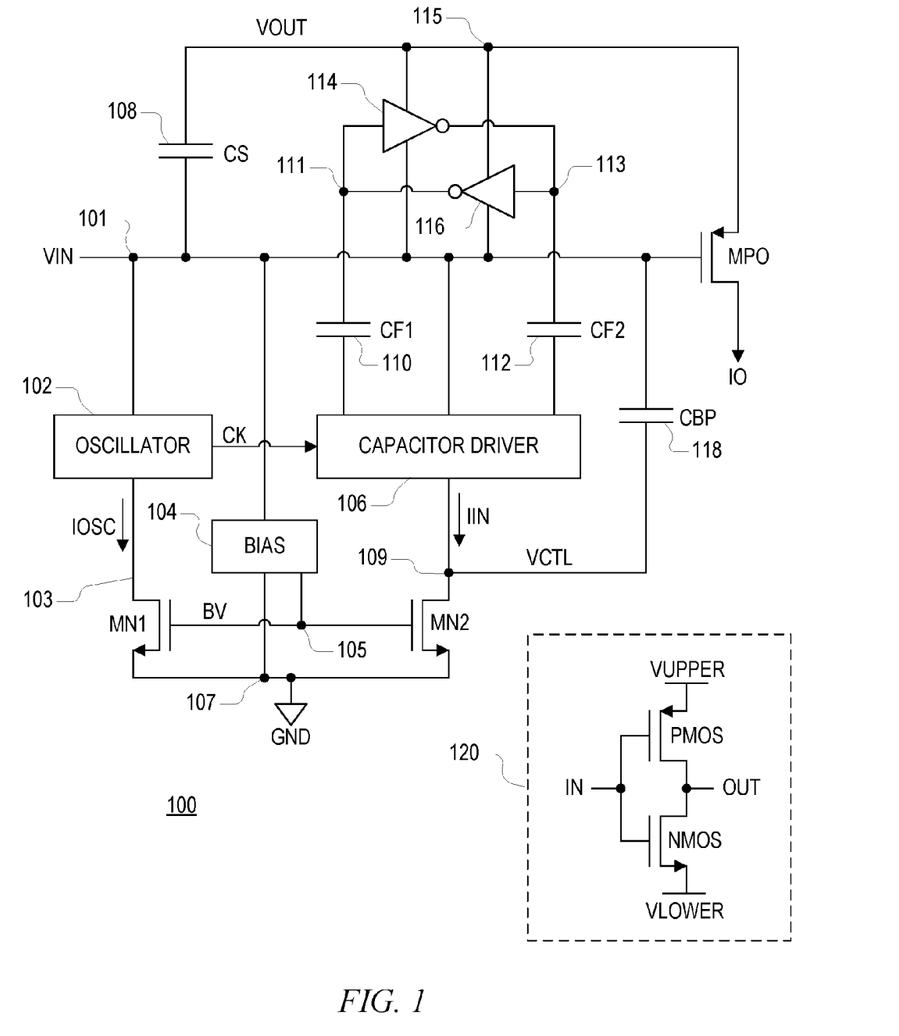
FIG. 1 is a schematic and block diagram of a current to current charge pump implemented according to one embodiment of the present invention.

FIG. 1 is a schematic and block diagram of a current to current charge pump 100 implemented according to one embodiment of the present invention. An input node 101 receives an input voltage VIN and is coupled to an oscillator 102, a bias circuit 104, a capacitor driver 106, and to the gate terminal of a P-channel output transistor MPO. It is noted that each transistor device described herein, including the output transistor MPO, has first and second current terminals and a control terminal. Each transistor described herein, including MPO, may be implemented with one or more MOS (metal-oxide semiconductor), FET (field-effect transistor), or MOSFET devices, in which the current terminals are the drain and source terminals and the control terminal is the gate terminal. The oscillator 102 has an upper supply voltage terminal coupled to VIN, a lower supply voltage terminal coupled to a node 103, and an output providing a clock signal CK to an input of the capacitor driver 106. Node 103 is further coupled to the drain terminal of an N-channel transistor MN1, having its gate terminal coupled to a bias node 105 that receives a bias voltage BV from the bias circuit 104. MN1 has a source terminal coupled to a reference node 107 shown coupled to GND. In general, the reference node 107 may have any suitable positive, negative or zero voltage level in various configurations, in which GND is typically considered to have a voltage level of 0 Volts (V) in the illustrated configuration.

The bias circuit 104 is shown coupled to VIN and GND having an output developing the bias voltage BV on the bias node 105. The capacitor driver 106 is shown coupled between VIN and a control node 109 which develops a control voltage VCTL. The control node 109 is further coupled to the drain terminal of an N-channel transistor MN2, having its gate terminal coupled to the bias node 105 and having its source terminal coupled to reference node 107 (GND). The drain current of MN2 is shown developing an input current IIN. MN2 may be referred to as an input transistor or a current control transistor. A pair of flying capacitors 110 and 112, with capacitances CF1 and CF2, respectively, each have a lower terminal coupled to the capacitor driver 106. The upper terminal of CF1 is coupled to a first "flying" node 111 and the upper terminal of CF2 is coupled to a second flying node 113. A pair of cross-coupled rectifier inverters 114 and 116 are coupled between the flying nodes 111 and 113. The inverter 114 has its input coupled to node 111 and its output coupled to node 113, and the inverter 116 has its input coupled to node 113 and its output coupled to node 111. Each of the inverters 114 and 116 has an upper supply voltage terminal coupled to an output node 115 developing an output voltage VOUT, and a lower supply voltage terminal coupled to the input node 101 (VIN). A storage capacitor 108 having a capacitance CS is coupled between the input node 101 and the output node 115, or between VIN and VOUT. VOUT is provided to the source terminal of MPO, having its drain terminal providing an output current IO. A bypass capacitor 118 having a capacitance CBP is coupled between the input node and the control node, or between VIN and VCTL.

An exemplary configuration of each of the inverters 114 and 116 is shown at 120. A complementary pair of MOS transistors, PMOS and NMOS, are shown having their current terminals (drains and sources) coupled in series between an upper voltage level VUPPER and a lower voltage level VLOWER. In particular, the source of PMOS is coupled to VUPPER and its drain is coupled to the drain of NMOS at an output node providing an output signal OUT. The source of NMOS is coupled to VLOWER, and an input signal IN is provided to the gate terminals of both PMOS and NMOS. When IN is driven high, PMOS is off and NMOS is on so that OUT is pulled low to VLOWER. When IN is pulled low, PMOS is on and NMOS is off so that OUT is driven high to VUPPER. For both of the inverters 114 and 116, VUPPER is VOUT and VLOWER is VIN. This configuration may apply to any inverter shown and described herein unless otherwise stated, in which VUPPER, VLOWER, IN and OUT depend upon how the inverter is coupled in the circuit.

Although MN1 may have any suitable size, it is generally relatively small with a size suitable to develop sufficient current, shown as IOSC, to drive the oscillator 102. Similarly, MN2 may have any suitable size, but generally has a size to develop the input current IIN at a selected level in order to set the desired level of the output current IO. MN2 may be a single transistor with the desired size, or MN2 may be implemented as multiple N-channel transistors coupled in parallel to set IIN at the desired current level.

In operation of the current to current charge pump 100, when power is applied, the bias circuit 104 develops the bias voltage BV on the bias node 105 to begin activating the transistors MN1 and MN2. MN1 develops IOSC to provide current to activate the oscillator 102, and MN2 turns on to begin charging the bypass capacitor 118 and to provide current to activate the capacitor driver 106. The oscillator 102 begins toggling the clock signal CK between upper and lower logic states, and in response to CK and as the voltage of the capacitor 118 builds, the capacitor driver 106 operates to drive the lower terminals of the flying capacitors 110 and 112 between the voltages VIN and VCTL. The flying capacitors 110 and 112 are driven in an opposite manner with respect to each other, so that when the lower terminal of capacitor 110 is pulled low to VCTL, the lower terminal of capacitor 112 is driven high to VIN, and vice-versa.

During operation, the capacitors 110 and 112 each charge to the voltage level of VIN-VCTL and further operate to charge the storage capacitor 108 (CS) after successive cycles of CK. When the lower terminal of the capacitor 110 is driven up to VIN while the lower terminal of the capacitor 112 is pulled low to VCTL, node 111 is driven high so that the inverter 114 pulls node 113 low to VIN. In this case, the NMOS within the inverter 114 is turned on to couple node 113 to the input node 101 at the input voltage VIN. The inverter 116 in turn drives the voltage of node 111 to the voltage level of VOUT. In this case, the PMOS within the inverter 116 is turned on to couple node 111 to the output node 115 at the output voltage VOUT. At the next transition of CK, the inverters 114 and 116 switch so that node 111 is pulled low to VIN while node 113 is pushed high to VOUT. Operation repeats in this manner during successive clock cycles of CK.

As the voltage of VOUT increases relative to VIN, MPO begins to turn on to supply the output current IO. IO continues to increase until it approaches the magnitude of the input current IIN, at which point the output voltage VOUT reaches equilibrium. If the devices were 100% efficient, then IO would be equal to IIN. There are, however, losses in the circuit. There are losses from the bottom plate capacitance of the flying capacitors 110 and 112. Each of the capacitors in the circuit may be implemented according to any one of many different types of capacitors. In one embodiment, the flying capacitors may be MIM (metal-insulator-metal) capacitors to minimize losses. There are further losses in the capacitor driver 106 and the inverters 114 and 116, and there are losses each time a charged capacitor discharges to a lower voltage. The amount of total loss depends upon design of each of the devices and components. Typical losses are about 10% to 15%, so that IO is about 10% to 15% lower than IIN.

The current to current charge pump 100 does not have feedback to control the output current, yet nonetheless self-regulates to maintain the output current IO at a relatively constant ratio with respect to IIN. The bias circuit 104 sets the bias voltage BV and thus sets the input current IIN at a predetermined level. As described further below, in one embodiment the bias circuit 104 establishes a reference current that is used to set IIN via a current mirror configuration. If the drain voltage of MPO attempts to go positive above the voltage level of VIN, MPO is forced into the triode mode of operation. In this case, IO begins to decrease, but most of the IIN current through MN2 goes to the output node 115 to increase the voltage level of VOUT. In this manner, the current to current charge pump 100 behaves like a current source. The output voltage VOUT increases, which increases the gate-to-source voltage (VGS) of MPO which in turn increases the output current IO. At some point, the output current IO reaches the self-regulation level (based on IIN minus losses as previously described) and then continues to self-regulate at that level. In this manner, the ratio of the input current IIN to the output current IO stays relatively close over temperature and process variation.

Another advantage of the current to current charge pump 100 is its ability to operate with low supply voltage. VIN only needs to be large enough to keep the capacitor driver 106 running in response to CK. Typically, the control node voltage VCTL can be within only a small voltage offset relative to GND. In one embodiment, the control node voltage VCTL may be within only about 0.1V of GND. Another lower limitation to VIN is the load of the charge pump, which is the VGS of MPO plus a small drop in the rectifier inverters 114 and 116. The VGS of MPO depends upon the threshold voltage of MPO, which is a process parameter. It is noted that the storage capacitor 108 (CS) may be omitted in configurations in which increased ripple on the output node 115 and increased noise ripple of the output current IO may be tolerated.

Figure 2:
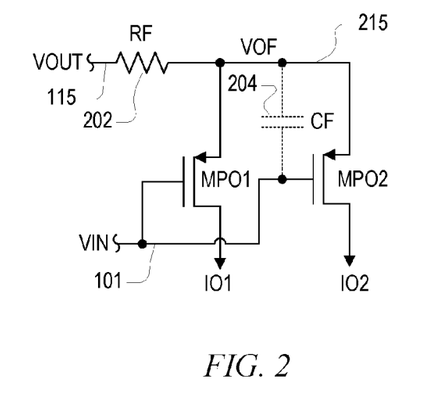
FIG. 2 is a schematic diagram of an alternative configuration of the output portion of the current to current charge pump of FIG. 1.

FIG. 2 is a schematic diagram of an alternative configuration of the output portion of the current to current charge pump 100. A filter resistor 202 with filter resistance RF is interposed between the output node 115 and a filtered output node 215 developing a filtered output signal VOF, in which the source terminal of MPO is instead coupled to the filtered output node 215. The filter resistor 202 minimizes voltage ripple on VOF. In addition, a filter capacitor 204 with a filter capacitance CF may be coupled between VOF and VIN to establish a resistor-capacitor (RC) filter, if desired. The filter capacitor 204 is shown with dotted lines since it may be extraneous given the gate to source capacitance of MPO1 and MPO2. Also, an additional output transistor may be added at the output to provide an additional output current. As shown, first and second output transistor MPO1 and MPO2 each have a source terminal coupled to node 215 (VOF) and a gate terminal coupled to the input node 101 (VIN). The drain terminal of MPO1 provides a first output current IO1 and the drain terminal of MPO2 provides a second output current IO2. As further described below, the output portion may be replaced with a cascode configuration.

Figure 3:
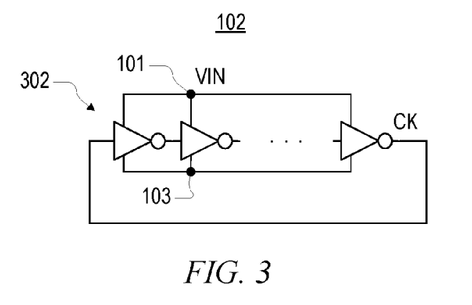
FIG. 3 is a schematic diagram of the oscillator of FIG. 1 according to one embodiment configured as a ring oscillator.

FIG. 3 is a schematic diagram of the oscillator 102 according to one embodiment configured as a ring oscillator. The ring oscillator includes an odd-numbered set of inverters 302 are coupled in series, in which the output of a last inverter develops the CK signal which is fed back to the input of the first inverter in the series of inverters. The number of inverters should be a prime number of three or more. Each inverter has its upper supply voltage terminal coupled to the input node 101 receiving VIN, and each has its lower supply voltage terminal coupled to node 103. When CK is high, the signal propagates through the delays of each of the inverters 302 to eventually pull CK back low, which again propagates through the delays of each of the inverters 302 to eventually pull CK back high, and so on. In this manner, the ring oscillator toggles CK between VIN (high) and the voltage level of node 103 (low). It is understood that the oscillator 102 may be implemented using alternative oscillator architectures and is not limited to ring type oscillators.

Figure 4:
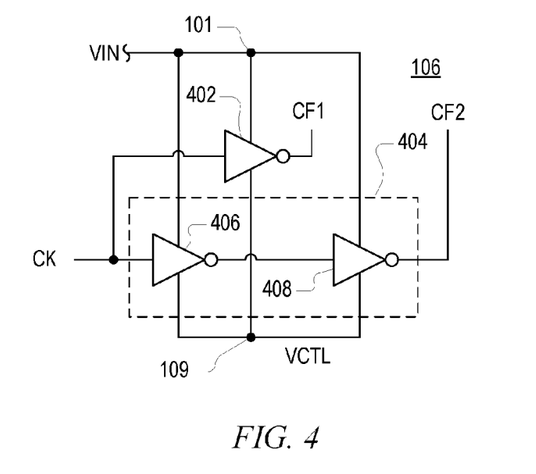
FIG. 4 is a schematic diagram of the capacitor driver of FIG. 1 according to one embodiment.

FIG. 4 is a schematic diagram of the capacitor driver 106 according to one embodiment. CK is provided to the input of an inverting buffer 402 having its output coupled to the lower terminal of the first flying capacitor 110 (CF1). CK is provided to the input of a buffer 404 having its output coupled to the lower terminal of the second flying capacitor 112 (CF2). The buffer 404 may be configured as a series-coupled pair of inverters 406 and 408, in which the output of the inverter 408 is a buffered version of CK after a small delay. Each of the inverters 402, 406 and 408 has an upper supply voltage terminal coupled to the input node 101 and a lower supply voltage terminal coupled to the control node 109, so that the outputs of the buffers 402 and 404 (or 408) toggle between VIN and VCTL. As previously described, when the inverting buffer 402 pulls the lower terminal of CF1 low to VCTL, the buffer 404 drives the lower terminal of CF2 up to VIN, and when the inverting buffer 402 drives the lower terminal of CF1 up to VIN, the buffer 404 pulls the lower terminal of CF2 down to VCTL. Operation toggles in this manner with successive clock cycles of CK.

Figure 5A:
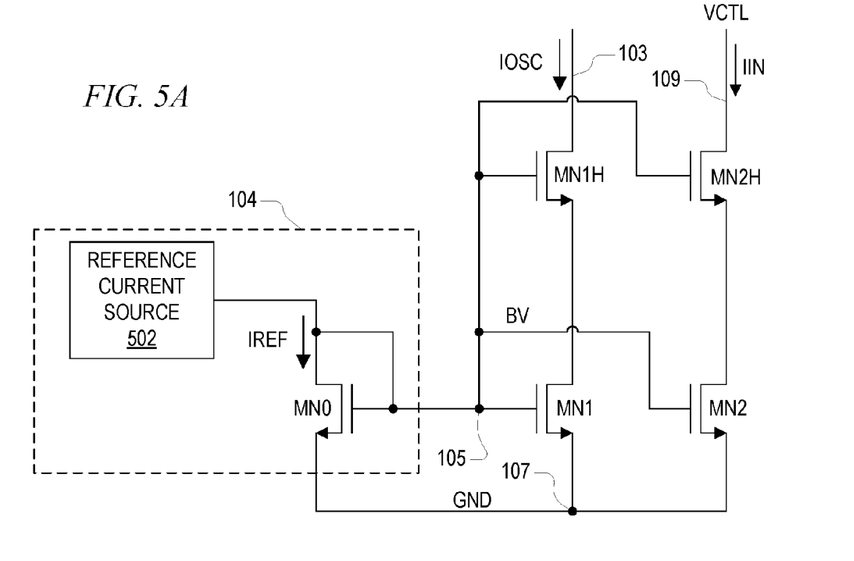
FIG. 5A and FIG. 5B are schematic diagrams of alternative embodiments of the input portion of the current to current charge pump of FIG. 1 according to another embodiment, which includes a cascode input stage.

FIG. 5A is a schematic diagram of an alternative embodiment of the input portion of the current to current charge pump 100 according to another embodiment, which includes a cascode input stage. A cascode configuration includes higher voltage cascode transistors to protect lower voltage transistors from higher voltage levels, such as a high voltage level of VIN. In the illustrated embodiment, MN1 and MN2 both comprise lower voltage transistors in which higher voltage transistors MN1H and MN2H are coupled in a cascode configuration. The drain terminal of MN1 is coupled to the source terminal of MN1H, which has its gate terminal coupled to the bias node 105 and its drain terminal coupled to node 103. In similar manner, the drain terminal of MN2 is coupled to the source terminal of MN2H, which has its gate terminal coupled to the bias node 105 and its drain terminal coupled to the control node 109. The higher voltage transistors isolate the lower voltage transistors from being exposed to higher voltage levels. This enables the current to current charge pump 100 to be configured to operate at higher voltages, such as 45V or 60V or the like. In a more specific configuration, MN0, MN1 and MN2 are implemented with 2V transistors, and MN1H and MN2H are implemented with 65V depletion mode transistors.

The bias circuit 104 includes a reference current source 502 that outputs a reference current IREF to the drain terminal of a reference N-channel transistor MN0. MN0 is diode-coupled, meaning it has its drain and gate terminals coupled together at an output of the bias circuit 104 and has its source terminal coupled to GND, in which the output of the bias circuit 104 is coupled to the bias node 105. IREF establishes a gate-to-source voltage of MN0 which is the bias voltage BV developed on the bias node 105. MN1 and MN2 are both coupled in a current mirror configuration relative to MN0, in which the source terminals of MN1 and MN2 are coupled to node 107 and their gate terminals are coupled to the bias node 105. In this manner, the sizes of MN1 and MN2 are set relative to the size of MN0 to determine the corresponding amount of drain current relative to IREF as further described herein.

The size of MN1 sets IOSC from node 103 to node 107 through MN1 at a level sufficient to drive the oscillator 102. In one embodiment, MN1 is the same size as MN0. The size of MN2 is set to control the level of the input current IIN, which further determines the desired output current IO since the magnitude of the output current IO follows the magnitude of the input current. In one embodiment, MN2 is a single transistor that is larger by a certain multiple of MN0 so that IIN is the same multiple times the magnitude of IREF. In another embodiment, MN2 is configured as multiple transistors coupled in parallel. In one embodiment, each parallel-coupled transistor may be the same size as MN0, in which IIN is the same multiple times IREF. In one embodiment, the multiple is 10, but any suitable multiple may be chosen for a given configuration. It is noted that MN1 and MN2 may have any desired size and may be implemented with any suitable number of transistors.

Figure 5B:
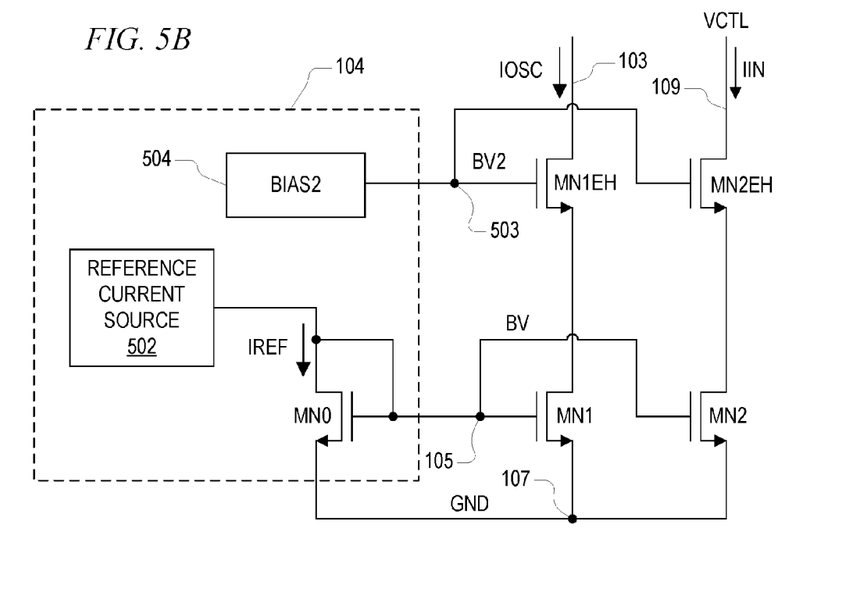

FIG. 5B is a schematic diagram of an alternative embodiment of the input portion of the current to current charge pump 100 according to another embodiment, which includes a cascode input stage similar to that shown in FIG. 5A. MN0, MN1 and MN2 are coupled in substantially the same manner. In this case, the high voltage transistors MN1H and MN2H are replaced by high voltage enhancement mode transistors MN1EH and MN2EH, respectively. The drain and source terminals of MN1EH and MN2EH are coupled in similar cascode fashion as MN1H and MN2H, respectively. In this case, the bias circuit 104 includes a separate bias circuit 504 (BIAS2) which operates in similar manner as the reference current source 502 to provide a separate output for developing a separate and independent bias voltage BV2 on a separate bias node 503. The gate terminals of MN1EH and MN2EH are instead coupled to the bias node 503 to provide proper biasing for the high voltage enhancement mode transistors MN1EH and MN2EH as understood by those of ordinary skill in the art.

Figure 6:
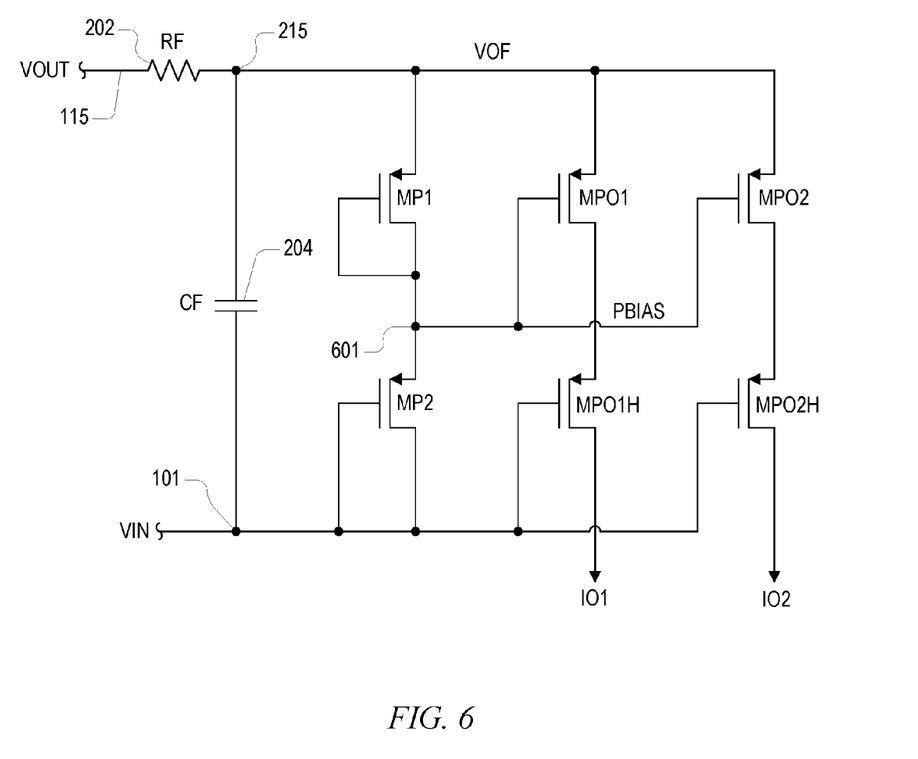
FIG. 6 is a schematic diagram of an alternative embodiment of the output portion of the current to current charge pump of FIG. 1 according to another embodiment, which includes a cascode output stage.

FIG. 6 is a schematic diagram of an alternative embodiment of the output portion of the current to current charge pump 100 according to another embodiment, which includes a cascode output stage. Again, the cascode configuration protects lower voltage transistors from higher voltage levels of VIN. The output node 115 is coupled through the filter resistor 202 (RF) to the filtered output node 215. The filter capacitor 204 is shown coupled between nodes 215 and 101, although the capacitor 204 may not be necessary depending upon the capacitance of the output transistors. The cascode configuration in this case includes a voltage divider including diode-connected P-channel transistors MP1 and MP2 coupled in series between node 101 and 215. As shown, the drain and gate terminals of MP2 are coupled to the input node 101, and its source terminal is coupled to an intermediate bias node 601 which is further coupled to the drain and gate terminals of MP1. The source terminal of MP1 is coupled to the filtered output node 215. The bias node 601 develops an intermediate bias voltage PBIAS for lower voltage output transistors MPO1 and MPO2.

In the cascode configuration, MPO1 and MPO2 each have their source terminals coupled to node 215 and their gate terminals coupled to the bias node 601. The drain terminal of MPO1 is coupled to the source terminal of a higher voltage P-channel transistor MPO1H, which has its gate terminal coupled to the input node 101 and its drain terminal providing the first output current IO1. Similarly, the drain terminal of MPO2 is coupled to the source terminal of a higher voltage P-channel transistor MPO2H, which has its gate terminal coupled to the input node 101 and its drain terminal providing the second output current IO2. It is noted that MPO1 and MPO2 may each be implemented with multiple transistors coupled in parallel in a similar manner as previously described for MN2.

In a more specific embodiment, MP1 is a 5V PMOS having a VGS of 0.53V and MP2 is a 2V PMOS having a VGS of 0.45V. It is noted that the VGS of MP2 would normally be lower, but its back gate bias of 0.53V increases its VGS. MPO1H and MPO2H each have threshold voltages similar to MP1. However, their W/L (width to length) ratio of (2×12.5)/10=2.5 is about 10 times smaller than the W/L ratio of (6×12)/3=24 for MPO1 and MPO2. This results in a larger VGS for MPO1H and MPO2H that is typically 0.71V. This also means that MPO1 and MPO2 each have source-drain voltages of 0.27V. VOF-VIN is 0.53V+ 0.45V=0.98V. There is an additional drop across the filter resistor RF of 0.02V which brings the unfiltered output voltage, VOUT, to about 1.00V. It is noted, however, that this voltage depends on temperature and process. When the headroom needed by the NMOS current sources is added, the circuitry of the charge pump has a minimum operating voltage of 1.6V for VIN for all conditions for this particular configuration.

A cascode configuration is contemplated including the cascode input configuration shown in FIG. 5A or 5B along with the cascode output configuration shown in FIG. 6. High voltage transistors (e.g., FETs) isolate the lower voltage transistors from the higher voltage levels. The cascoding of low and high voltage transistors minimize current changes due to power supply changes causing changes of VIN. This provides very high power supply rejection ratio performance.

Figure 7:
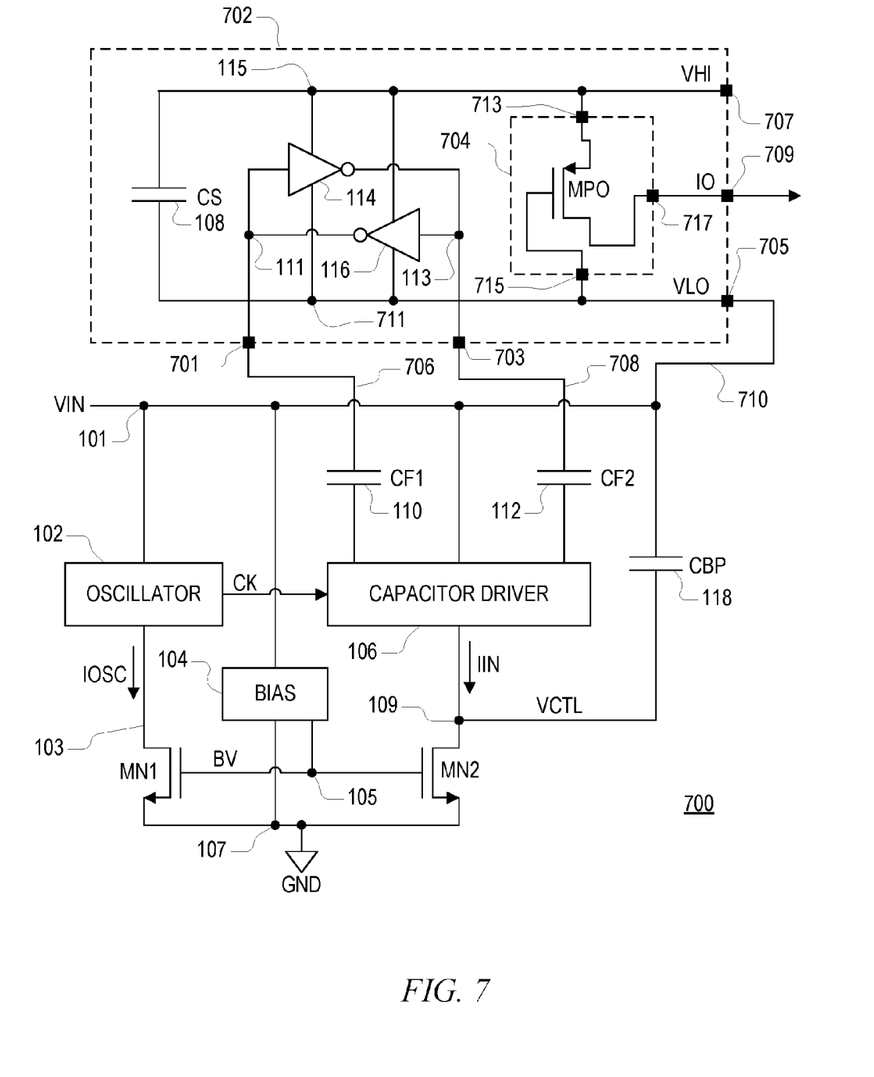
FIGS. 7 and 8 are schematic and block diagrams of a current to current charge pump implemented according to another embodiment of the present invention in which the upper portion of the circuit is separated for selectable connectivity between upper and lower voltage nodes to enable different connectivity and different operation for different configurations.

FIG. 7 is a schematic and block diagram of a current to current charge pump 700 implemented according to another embodiment of the present invention. The current to current charge pump 700 is similar to the current to current charge pump 100 in which similar components assume identical reference numbers. The oscillator 102, the bias circuit 104, the capacitor driver 106, the capacitors 110, 112 and 118, and the transistors MN1 and MN2 are coupled together in the same manner. However, the storage capacitor 108, the rectifier inverters 114 and 116, and the output transistor MPO are shown provided within a separate rectifier-output circuit 702. The rectifier-output circuit 702 includes several input/output (I/O) nodes 701, 703, 705, 707 and 709 for coupling to external devices. Node 701 is internally coupled to node 111 which is coupled to the input of the inverter 114 and to the output of the inverter 116 in similar manner. Node 703 is internally coupled to node 113 which is coupled to the input of the inverter 116 and to the output of the inverter 114 in similar manner. Node 707 is internally coupled to node 115, which is further coupled to the upper supply voltage terminals of the inverters 114 and 116 and to the upper terminal of the storage capacitor 108. Node 115 is internally renamed as VHI, in which VOUT or VHI may each be generally referred to as an upper voltage node. Node 705 is internally coupled to a separate node 711 named VLO, which is coupled to the lower terminal of the storage capacitor 108 and to the lower supply voltage terminals of the inverters 114 and 116. VIN or VLO may each be generally referred to as a lower voltage node.

The output transistor MPO is shown provided within a separate output circuit 704 provided within the rectifier-output circuit 702. The output circuit 704 includes an I/O node 713 coupled to node 115, an I/O node 715 coupled to node 711, and an I/O node 717 coupled to the I/O node 709 of the rectifier-output circuit 702. Within the output circuit 704, MPO has its source terminal coupled to node 713 (and thus to node 115), its gate terminal coupled to node 715 (and thus to node 711 or VLO), and its drain terminal coupled to node 717 (and thus to node 709 of the rectifier-output circuit 702) in which the drain terminal of MPO provides the output current IO via the I/O node 709. In this manner, MPO is coupled between VHI and VLO in substantially similar manner as coupled between VOUT and VIN for the current to current charge pump 100.

The rectifier-output circuit 702 is coupled to the remaining components in substantially similar manner as for the current to current charge pump 100. In particular, a connection 706 connects the upper terminal of the flying capacitor 110 to I/O node 701, a connection 708 connects the upper terminal of the flying capacitor 112 to I/O node 703, and a connection 710 connects the input node 101 to the I/O node 705. Thus, the input voltage VIN on the input node 101 is coupled to the VLO node 711 within the rectifier-output circuit 702, and node 115 develops VHI as the output voltage VOUT. In this manner, the current to current charge pump 700 is electrically coupled in the same manner as the current to current charge pump 100 and operates in the same manner as previously described. The separate configuration of the rectifier-output circuit 702 from the remaining portion of the circuit enables different connectivity and different operation for different configurations.

Figure 8:
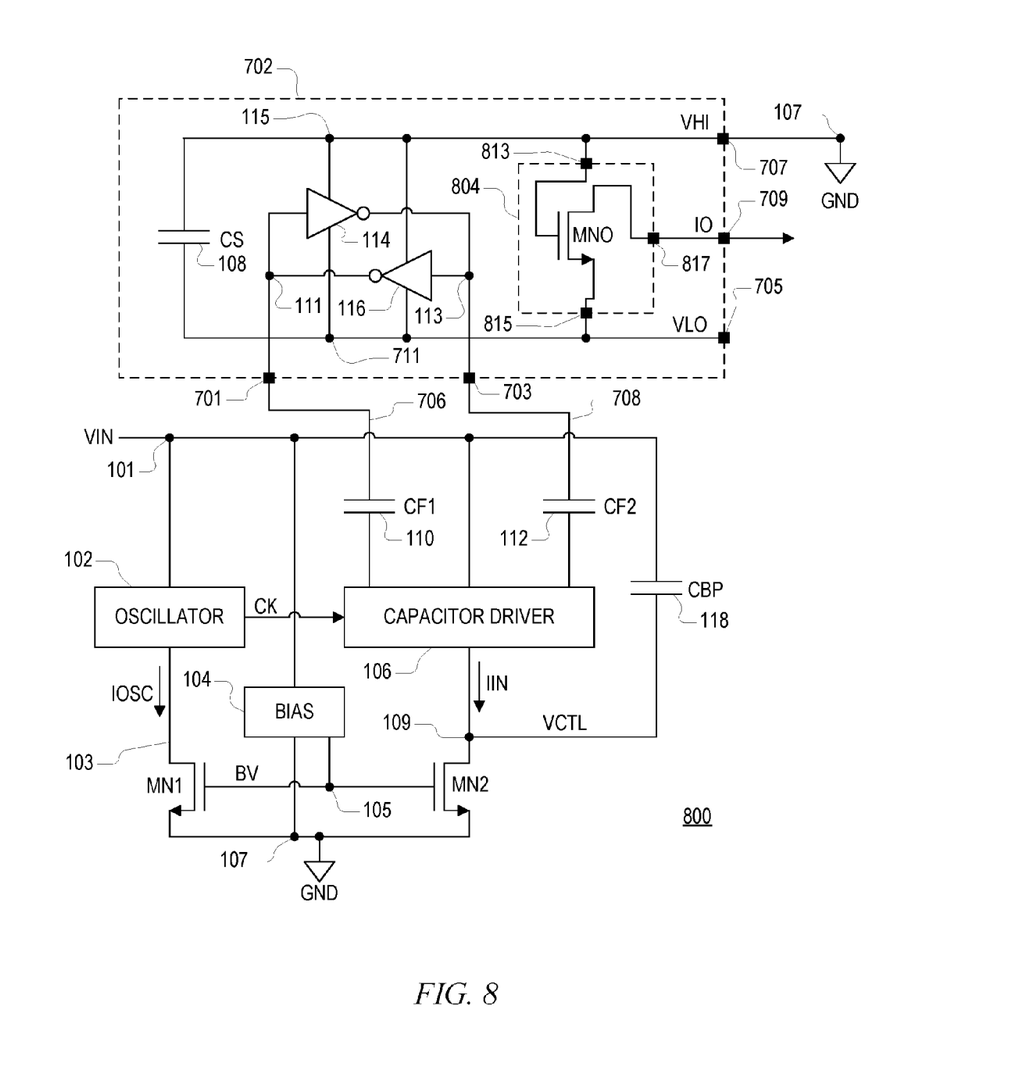

FIG. 8 is a schematic and block diagram of a current to current charge pump 800 implemented according to another embodiment of the present invention. The current to current charge pump 800 is similar to the current to current charge pump 700 in which similar components assume identical reference numbers. Again, the oscillator 102, the bias circuit 104, the capacitor driver 106, the capacitors 110, 112 and 118, and the transistors MN1 and MN2 are coupled together in the same manner. Also, the circuit 702 is provided and coupled in similar manner. In this case, however, the connection 710 is omitted and the I/O node 707 of the rectifier-output circuit 702 is instead coupled to the reference node 107 (e.g., GND). In this manner, rather than tying VLO to VIN and allowing the upper node VHI to float, VHI is tied to a source voltage and VLO (on node 711) is allowed to float to a lower or negative output voltage.

Furthermore, the output circuit 704 is replaced by another output circuit 804 in which the output transistor MPO is replaced by an N-channel output transistor MNO. The output circuit 804 includes an I/O node 813 coupled to node 115, an I/O node 815 coupled to node 711, and an I/O node 817 coupled to the I/O node 709 of the rectifier-output circuit 702. Within the output circuit 804, MNO has its source terminal coupled to node 815 (and thus to node 711), its gate terminal coupled to node 813 (and thus to node 115 or VHI), and its drain terminal coupled to node 817 (and thus to node 709 of the rectifier-output circuit 702) in which the drain terminal of MNO provides the output current IO via the I/O node 709. In this manner, MNO is coupled between VHI and VLO in a slightly different configuration in order for MNO to sink the output current from an external circuit. In particular, the current to current charge pump 800 operates as a current sink in which the output current IO is negative and flows into the drain current of MNO.

It is noted that the voltage levels of VHI and VLO of the rectifier-output circuit 702 may be anywhere as long as VHI>VLO and so long that each of the circuit components are within their rated voltage levels. VHI, for example, may have a very low voltage level, may even be at 0V (e.g., GND), and may even have a negative voltage level so long as VLO is less than VHI by a minimum threshold level. Thus, if VHI is 0V or a negative voltage level, VLO is also negative. Also, either one of VHI or VLO is connected to a constant voltage source and the other one is allowed to float. The current to current charge pump 700, for example, ties VLO to a constant voltage source (e.g., VIN) and floats VOUT, in which MPO is provided to develop the output current IO (as a current source). On the other hand, the current to current charge pump 800 ties VHI to a constant voltage source (e.g., GND) and floats VLO, in which MNO is provided to develop the output current IO (as a current sink). The particular configuration used depends upon the particular application into which it is employed. In any of the embodiments, the input current is set to the appropriate level based on a reference current, and the current to current charge pump self regulates in which the output current follows the input current.

The alternative configuration shown in FIG. 2 equally applies to either of the current to current charge pumps 700 and 800. The output voltage VOUT is replaced by the upper voltage VHI and the input voltage VIN is replaced by the lower voltage VLO. For the current to current charge pump 700, the output circuit 704 may include multiple P-channel transistors each coupled between VHI and VLO and each having a terminal providing a corresponding one of multiple output currents. For example, MPO1 and MPO2 may each be coupled in similar manner between VHI and VLO providing IO1 and IO2, respectively. The filter resistor 202 may be included in the current to current charge pump 700, in which it is provided between VHI and a filtered version thereof (e.g., VHIF, not shown), in which the source terminals of the output transistors are instead coupled to VHIF. Also, the filter capacitor 204 may be included and coupled between VHIF and VLO if desired. Similarly, for the current to current charge pump 800, the output circuit 804 may include multiple N-channel transistors each coupled between VHI and VLO in similar manner as MNO and each having a terminal providing a corresponding one of multiple output currents. The filter resistor 202 may be provided between VLO and a filtered version thereof (e.g., VLOF, not shown), in which the source terminals of the output transistors are instead coupled to VLOF. Also, the filter capacitor 204 may be included and coupled between VHI and VLOF if desired.

In similar manner, the cascode output configuration shown in FIG. 6 equally applies to either of the current to current charge pumps 700 and 800. Again, VHI replaces VOUT and VLO replaces VIN. If the filter resistor 202 is not included, then the cascode and output transistors are coupled to VHI and VLO. If the filter resistor 202 is included, then the cascode and output transistors are instead coupled to VHIF and VLO for the current to current charge pump 700, or to VHI and VLOF for the current to current charge pump 800. If the filter capacitor 204 is included, then it is coupled between VHIF and VLO for the current to current charge pump 700, or between VHI and VLOF for the current to current charge pump 800.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. A current to current charge pump, comprising:
   a first flying capacitor and a second flying capacitor;
   a capacitor driver that drives a first end of said first and second flying capacitors to opposite states between a control node and an input voltage node using a clock signal;
   first and second rectifying inverters, wherein an input of said first rectifying inverter is coupled to an output of said second rectifying inverter and to a second end of said first flying capacitor, wherein an input of said second rectifying inverter is coupled to an output of said first rectifying inverter and to a second end of said second flying capacitor, and wherein each of said first and second rectifying inverters has a first supply terminal coupled to an upper voltage node and a second supply terminal coupled to a lower voltage node;
   wherein one of said upper voltage node and said lower voltage node is coupled to a constant voltage source;
   a current control transistor circuit having a drain terminal coupled to a control node, having a gate terminal coupled to a bias node, and having a source terminal coupled to a reference voltage node;
   a bypass capacitor coupled between said input voltage node and said control node; and
   an output circuit comprising at least one output transistor, each having a first terminal coupled to said upper voltage node, each having a second terminal coupled to said lower voltage node, and each having a third terminal providing a corresponding one of at least one output current.

2. The current to current charge pump of claim 1, further comprising a storage capacitor coupled between said upper voltage node and said lower voltage node.

3. The current to current charge pump of claim 1, wherein said capacitor driver comprises:
   an inverter having an input receiving said clock signal, having an output coupled to said first end of said first flying capacitor, having a first supply voltage terminal coupled to said input voltage node, and having a second supply voltage terminal coupled to said control node; and
   a buffer driver having an input receiving said clock signal, having an output coupled to said first end of said second flying capacitor, having a first supply voltage terminal coupled to said input voltage node, and having a second supply voltage terminal coupled to said control node.

4. The current to current charge pump of claim 1, further comprising a ring oscillator providing said clock signal.

5. The current to current charge pump of claim 1, further comprising:
   a bias circuit comprising:
      a reference current source providing a reference current to said bias node; and
      a reference transistor having a drain terminal and a gate terminal coupled together at said bias node and having a source terminal coupled to said reference voltage node; and
   wherein said current control transistor circuit comprises at least one current control transistor having a size that is an integer number N times a size of said reference transistor in which an input current developed at said drain terminal of said current control transistor circuit is N times said reference current.

6. The current to current charge pump of claim 1, further comprising a filter resistor coupled between said upper voltage node and said first terminal of said output circuit or between said lower voltage node and said second terminal of said output circuit.

7. The current to current charge pump of claim 1, wherein said at least one output transistor comprises a first output transistor providing a first output current and a second output transistor providing a second output current.

8. The current to current charge pump of claim 1, wherein said current control transistor circuit comprises an N-channel MOS transistor having a drain terminal coupled to said control node, having a gate terminal coupled to said bias node, and having a source terminal coupled to said reference voltage node.

9. The current to current charge pump of claim 1, wherein said output circuit comprises at least one P-channel MOS transistor, each having a source terminal coupled to said upper voltage node, each having a gate terminal coupled to said lower voltage node, and each having a drain terminal providing said corresponding one of at least one output current.

10. The current to current charge pump of claim 1, wherein said output circuit comprises at least one N-channel MOS transistor, each having a gate terminal coupled to said upper voltage node, each having a source terminal coupled to said lower voltage node, and each having a drain terminal providing said corresponding one of at least one output current.

11. The current to current charge pump of claim 1, wherein said current control transistor circuit comprises:
   at least one current control transistor, each having a drain terminal, each having a gate terminal coupled to said bias node, and each having a source terminal coupled to said reference voltage node; and
   a cascode transistor having a drain terminal coupled to said control node, having a gate terminal receiving a bias voltage, and having a source terminal coupled to said drain terminal of each of said at least one current control transistor.

12. The current to current charge pump of claim 11, further comprising:
a bias circuit comprising a reference transistor that develops a reference current from said bias node to said reference voltage node; and
wherein said at least one current control transistor develops an input current through said cascode transistor that is a selected multiple of said reference current.

13. The current to current charge pump of claim 12, wherein said at least one current control transistor comprises a plurality of current control transistors coupled in parallel each being the same size as said reference transistor.

14. The current to current charge pump of claim 11, wherein said gate terminal of said cascode transistor is coupled to said bias node and wherein said cascode transistor comprises a depletion mode N-channel MOS transistor.

15. The current to current charge pump of claim 11, further comprising:
a bias circuit coupled to a second bias node; and
wherein said gate terminal of said cascode transistor is coupled to said second bias node and wherein said cascode transistor comprises an enhancement mode N-channel MOS transistor.

16. The current to current charge pump of claim 1, wherein said output circuit comprises:
a voltage divider coupled between said upper voltage node and said lower voltage node having an intermediate node comprising a cascode bias node;
an output transistor having a source terminal coupled to said upper voltage node, having a gate terminal coupled to said cascode bias node, and having a drain terminal; and
a cascode transistor having a source terminal coupled to said drain terminal of said output transistor, having a gate terminal coupled to said lower voltage node, and having a drain terminal providing one of said at least one output current.

17. The current to current charge pump of claim 1, wherein said output circuit comprises:
a voltage divider coupled between said upper voltage node and said lower voltage node having an intermediate node comprising a cascode bias node;
a first output transistor having a source terminal coupled to said upper voltage node, having a gate terminal coupled to said cascode bias node, and having a drain terminal;
a second output transistor having a source terminal coupled to said upper voltage node, having a gate terminal coupled to said cascode bias node, and having a drain terminal;
a first cascode transistor having a source terminal coupled to said drain terminal of said first output transistor, having a gate terminal coupled to said lower voltage node, and having a drain terminal providing a first output current; and
a second cascode transistor having a source terminal coupled to said drain terminal of said second output transistor, having a gate terminal coupled to said lower voltage node, and having a drain terminal providing a second output current.

18. The current to current charge pump of claim 1, wherein said lower voltage node is connected to said input voltage node as said constant voltage source.

19. The current to current charge pump of claim 1, wherein said upper voltage node is connected to said reference voltage node as said constant voltage source.

20. A self regulating current to current charge pump, comprising:
a capacitor driver having a first supply voltage terminal coupled to an input node, having a second supply voltage terminal coupled to a control node, and having first and second drive outputs that are toggled to opposite states between said input node and said control node based on a clock signal;
an input transistor having a first current terminal coupled to said control node, having a control terminal coupled to a bias node, and having a second current terminal coupled to a reference node;
a first flying capacitor having a first terminal coupled to said first drive output of said capacitor driver and having a second terminal, and a second flying capacitor having a first terminal coupled to said second drive output of said capacitor driver and having a second terminal;
first and second inverters that are cross-coupled coupled between said second terminals of said first and second flying capacitors, each having a first supply voltage terminal coupled to an upper node, and each having a second supply voltage terminal coupled to a lower node;
wherein one of said upper node and said lower node is coupled to a constant voltage source;
a bypass capacitor coupled between said input node and said control node; and
an output transistor having a first terminal coupled to said upper node, having a second terminal coupled to said lower node, and having a third terminal providing an output current.

21. The self regulating current to current charge pump of claim 20, further comprising a storage capacitor coupled between said upper node and said lower node.

22. The self regulating current to current charge pump of claim 20, wherein said lower node is connected to said input node as said constant voltage source.

23. The self regulating current to current charge pump of claim 20, wherein said upper node is connected to said reference node as said constant voltage source.

* * * * *